United States Patent
Yoshimochi et al.

(10) Patent No.: US 8,923,420 B2
(45) Date of Patent: Dec. 30, 2014

(54) RECEPTION APPARATUS, RECEPTION METHOD, AND PROGRAM

(75) Inventors: Naoki Yoshimochi, Kanagawa (JP);
Hidetoshi Kawauchi, Kanagawa (JP);
Kazukuni Takanohashi, Saitama (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 13/235,816

(22) Filed: Sep. 19, 2011

(65) Prior Publication Data

US 2012/0099681 A1    Apr. 26, 2012

(30) Foreign Application Priority Data

Oct. 20, 2010    (JP) ................. 2010-235149

(51) Int. Cl.
*H04L 27/28*    (2006.01)
*H04L 27/26*    (2006.01)

(52) U.S. Cl.
CPC .................. *H04L 27/2647* (2013.01)
USPC ........................................ 375/260

(58) Field of Classification Search
CPC . H04L 27/2647; H04L 27/22; H04L 27/2675; H04N 5/913; H04J 3/0608; H04B 1/71637
USPC ................................. 375/260, 316
See application file for complete search history.

(56) References Cited

U.S. PATENT DOCUMENTS

| | | | |
|---|---|---|---|
| 7,065,703 B2* | 6/2006 | Krieger | 714/814 |
| 2003/0156654 A1 | 8/2003 | Blat | |
| 2006/0098751 A1* | 5/2006 | Zhang et al. | 375/260 |
| 2007/0243839 A1* | 10/2007 | Kostic | 455/132 |
| 2009/0103633 A1* | 4/2009 | Zhang | 375/240.26 |
| 2010/0215107 A1* | 8/2010 | Yang | 375/260 |
| 2010/0254475 A1* | 10/2010 | Kawauchi et al. | 375/267 |
| 2011/0099453 A1 | 4/2011 | Shinya et al. | |

FOREIGN PATENT DOCUMENTS

JP    2004-517511    6/2004

OTHER PUBLICATIONS

U.S. Appl. No. 13/235,917, filed Sep. 19, 2011, Ikegaya, et al.
U.S. Appl. No. 13/242,754, filed Sep. 23, 2011, Yoshimochi, et al.
U.S. Appl. No. 13/235,864, filed Sep. 19, 2011, Yoshimochi, et al.
U.S. Appl. No. 12/236,005, filed Sep. 19, 2011, Kawauchi, et al.

* cited by examiner

*Primary Examiner* — Don N Vo
(74) *Attorney, Agent, or Firm* — Oblon, Spivak, McClelland, Maier & Neustadt, L.L.P.

(57) ABSTRACT

A reception apparatus is disclosed which includes: a detection section configured to detect the presence or absence of spectrum inversion in data transmitted by a multi-carrier transmission system based on whether a known signal can be decoded using that part of the transmitted data which has been transmitted by carriers used for transmitting the known signal; and a correction section configured to correct the data transmitted by the multi-carrier transmission system if the presence of spectrum inversion is detected.

11 Claims, 15 Drawing Sheets

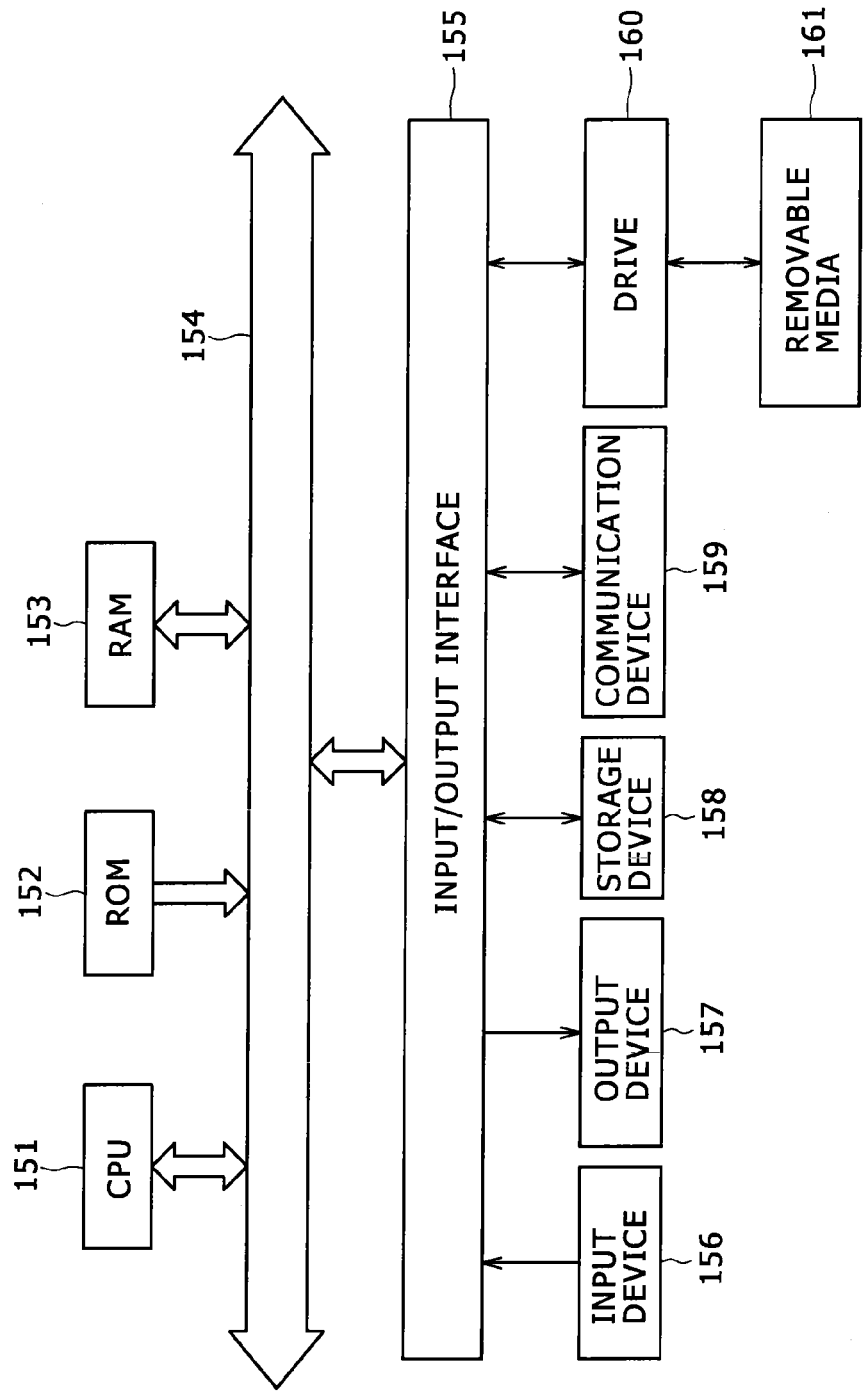

RECEPTION APPARATUS, RECEPTION METHOD, AND PROGRAM

BACKGROUND

The present disclosure relates to a reception apparatus, a reception method, and a program. More particularly, the present disclosure relates to a reception apparatus, a reception method, and a program for correctly demodulating data where spectrum inversion is present in a multi-carrier data transmission.

The Orthogonal Frequency Division Multiplexing (OFDM) system is used as a modulation system for terrestrial digital broadcasts. The OFDM system involves using numerous orthogonal carriers each of which is subjected to PSK (Phase Shift Keying) or QAM (Quadrature Amplitude Modulation) for modulation purposes.

Since data is assigned to a plurality of carriers, the OFDM system may constitute its transmission circuit using an IFFT (Inverse Fast Fourier Transform) operation circuit for performing an IFFT operation upon modulation, and structure its reception circuit using an FFT (Fast Fourier Transform) operation circuit for carrying an FFT operation upon demodulation.

With regard to the present disclosure, reference may be made to JP-T-2004-517511.

SUMMARY

In a multi-carrier data transmission that involves modulating data using a plurality of carriers such as those of the OFDM system, spectrum inversion may be present in the signal obtained by a reception apparatus having carried out an FFT operation. If spectrum inversion is present in the received signal, the reception apparatus may not be able to demodulate the data correctly.

The present disclosure has been made in view of the above circumstances and provides a reception apparatus, a reception method, and a program for correctly demodulating data where spectrum inversion is present in a multi-carrier data transmission.

According to one embodiment of the present disclosure, there is provided a reception apparatus including: a detection section configured to detect the presence or absence of spectrum inversion in data transmitted by a multi-carrier transmission system based on whether a known signal can be decoded using that part of the transmitted data which has been transmitted by carriers used for transmitting the known signal; and a correction section configured to correct the data transmitted by the multi-carrier transmission system if the presence of spectrum inversion is detected.

Preferably, the reception apparatus of the present disclosure may further include an FFT operation section configured to perform an FFT operation on a received signal. In this case, the correction section may include: a deinterleave section configured to read carrier indexes differently and, based on the differently read carrier indexes, to deinterleave the data obtained by the FFT operation from each carrier; and an output section configured to output I and Q data switched in positions thereof after being obtained by the deinterleave operation.

Preferably, the detection section may decode the known signal using the data obtained by the FFT operation from each carrier but yet to be deinterleaved.

Preferably, the detection section may detect the absence of spectrum inversion when the known signal can be decoded using the data transmitted by the carriers used for transmitting the known signal on the assumption that spectrum inversion is absent, the detection section further detecting the presence of spectrum inversion when the known signal can be detected using the data transmitted by the carriers used for transmitting the known signal on the assumption that spectrum inversion is present.

Preferably, the multi-carrier transmission system may comply with the DTMB standard, and the known signal may be system information included in each frame. In this case, the deinterleave section may subtract the carrier index of each carrier except 0 from 3780 so as to use the difference as the differently read carrier index thereof.

Preferably, the reception apparatus of the present disclosure may further include: an FFT operation section configured to perform an FFT operation on a received signal; and a deinterleave section configured to deinterleave the data obtained by the FFT operation from each carrier based on the carrier index thereof that is either read as is or read differently. In this case, the correction section may include an output section configured to output I and Q data switched in positions thereof after being obtained by the deinterleave operation based on the differently read carrier indexes.

Preferably, the detection section may decode the known signal using the deinterleaved data.

Preferably, the detection section may detect the absence of spectrum inversion if the known signal can be decoded when the deinterleave operation is performed without reading the carrier indexes differently, the detection section further detecting the presence of spectrum inversion if the known signal can be decoded when the deinterleave operation is performed by reading the carrier indexes differently.

Preferably, the multi-carrier transmission system may comply with the DTMB standard, and the known signal may be system information included in each frame. In this case, upon reading the carrier indexes differently, the deinterleave section may subtract the carrier index of each carrier except 0 from 3780 so as to use the difference as the differently read carrier index thereof. The detection section may decode the system information based on the data transmitted by the carriers having carrier indexes ranging from 0 to 35.

According to another embodiment of the present disclosure, there is provided a reception method including: detecting the presence or absence of spectrum inversion in data transmitted by a multi-carrier transmission system based on whether a known signal can be decoded using that part of the transmitted data which has been transmitted by carriers used for transmitting the known signal; and correcting the data transmitted by the multi-carrier transmission system if the presence of spectrum inversion is detected.

According to a further embodiment of the present disclosure, there is provided a program for causing a computer to execute a process including: detecting the presence or absence of spectrum inversion in data transmitted by a multi-carrier transmission system based on whether a known signal can be decoded using that part of the transmitted data which has been transmitted by carriers used for transmitting the known signal; and correcting the data transmitted by the multi-carrier transmission system if the presence of spectrum inversion is detected.

When the present disclosure is embodied as outlined above, the presence or absence of spectrum inversion is detected in data transmitted by a multi-carrier transmission system based on whether a known signal can be decoded using that part of the transmitted data which has been transmitted by carriers used for transmitting the known signal. The data transmitted by the multi-carrier transmission system is corrected if the presence of spectrum inversion is detected.
}

According to the present disclosure outlined above, data can be decoded correctly even if the presence of spectrum inversion is detected in a multi-carrier data transmission.

BRIEF DESCRIPTION OF THE DRAWINGS

FIG. 15 is a block diagram showing a typical structure of a computer.

DETAILED DESCRIPTION OF THE PREFERRED EMBODIMENTS

[Typical Structure of the Reception Apparatus]

Figure 1:
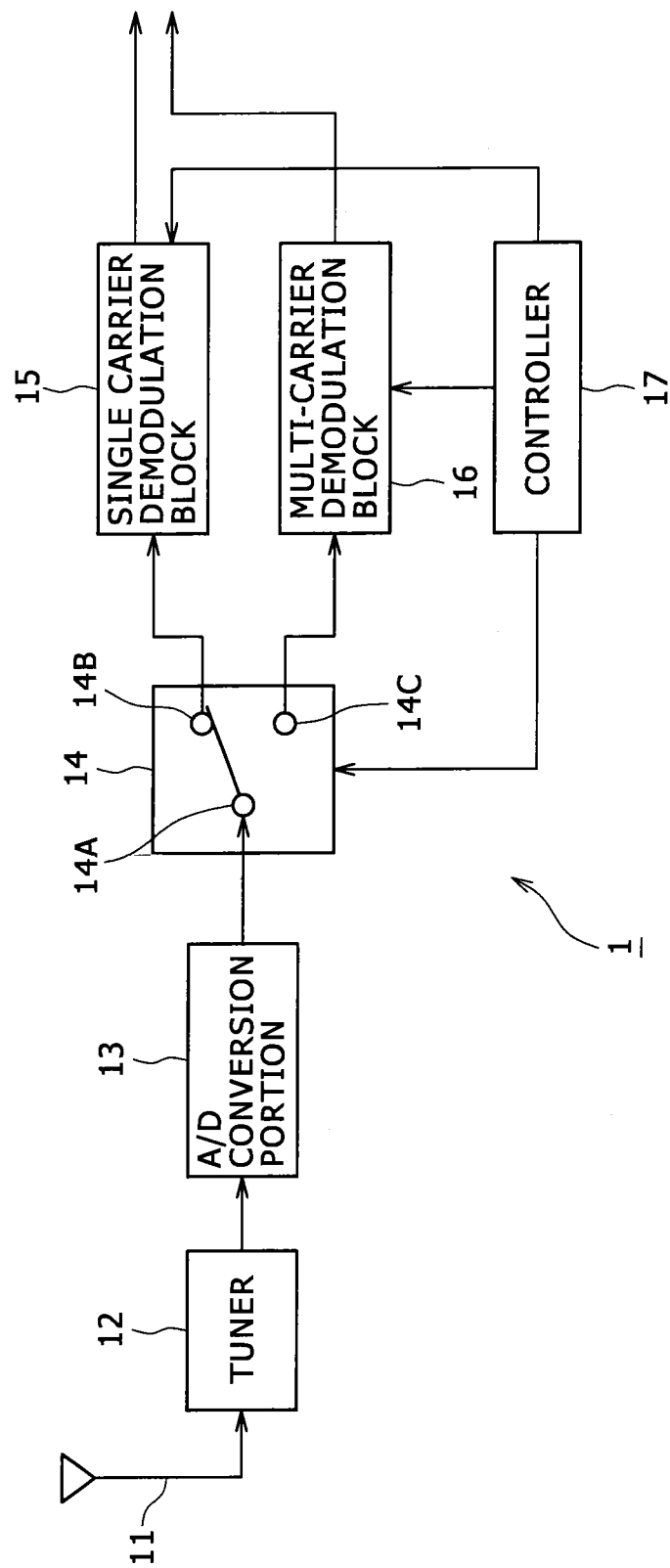
FIG. 1 is a schematic view showing a typical structure of a reception apparatus embodying the present disclosure.

FIG. 1 is a schematic view showing a typical structure of a reception apparatus 1 embodying the present disclosure.

The reception apparatus 1 is made up of an antenna 11, a tuner 12, an A/D conversion portion 13, a switching portion 14, a single carrier demodulation block 15, a multi-carrier demodulation block 16, and a controller 17. For example, the reception apparatus 1 may be a receiver that complies with the DTMB (Digital Terrestrial Multimedia Broadcast) standard for terrestrial digital broadcasts.

Under the DTMB standard, either a single carrier modulation system or a multi-carrier modulation system may be selected as the data modulation system. The reception apparatus complying with the DTMB standard is provided with the capability of demodulating data transmitted by the single carrier modulation system and the capability of demodulating data sent by the multi-carrier modulation system.

In the description that follows, single carrier transmission will refer to the act of transmitting data by the single carrier modulation system, and multi-carrier transmission will signify the act of transmitting data by the multi-carrier modulation system.

The tuner 12 receives an RF signal, frequency-converts the received RF signal into an IF signal, and outputs the IF signal thus obtained to the A/D conversion portion 13.

The A/D conversion portion 13 performs A/D conversion on the signal fed from the tuner 12, and outputs the resulting data.

The switching portion 14 under control of the controller 17 switches the destinations to which to output the data supplied from the A/D conversion portion 13. Upon demodulation of data transmitted by single carrier transmission, the switching portion 14 connects a switch 14A to a terminal 14B to let the data sent from the A/D conversion portion 13 be output to the single carrier demodulation block 15 for demodulation. On demodulation of data sent by multi-carrier transmission, the switching portion 14 connects the switch 14A to a terminal 14C to let the data fed from the A/D conversion portion 13 be output to the multi-carrier equalization block 16 for demodulation.

The single carrier demodulation block 15 under control of the controller 17 demodulates the data fed from the switching portion 14, and outputs the demodulated data.

The multi-carrier demodulation block 16 under control of the controller 17 demodulates the data supplied from the switching portion 14, and outputs the resulting data. If multi-carrier transmission is performed according to the OFDM system, what is input to the multi-carrier demodulation block 16 is a baseband OFDM signal obtained through an orthogonal demodulation process carried out on the output of the A/D conversion portion 13 by a processing portion, not shown.

For example, the data demodulated by the single carrier demodulation block 15 or multi-carrier demodulation block 16 may be forwarded to downstream processing portions for such processes as error correction.

The controller 17 executes relevant programs to control the entire-reception apparatus 1 in operation. For example, the controller 17 may control the switching portion 14 to switch the destinations to which to output data based on whether the modulation system used by the currently received channel is for single carrier transmission or for multi-carrier transmission.

Figure 2:
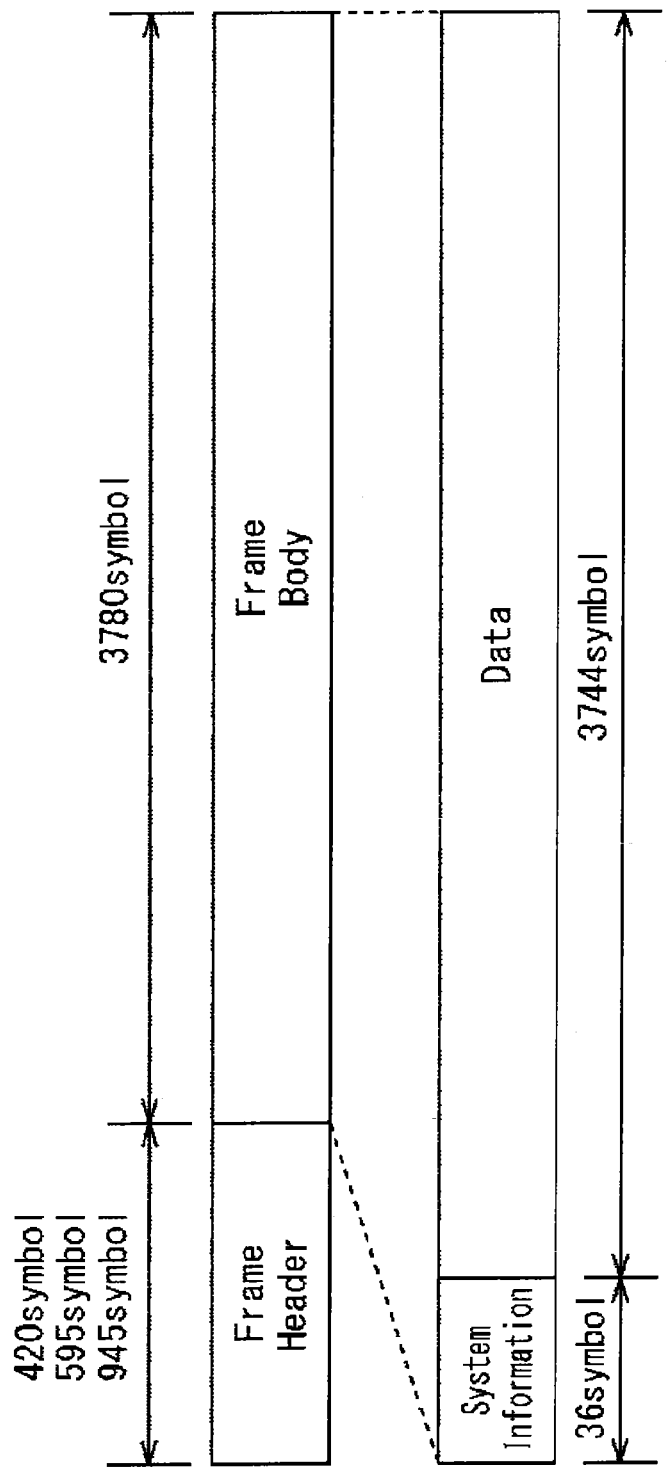
FIG. 2 is a schematic view showing the frame structure for a single carrier data transmission complying with the DTMB standard.

FIG. 2 is a schematic view showing the frame structure for a single carrier data transmission complying with the DTMB standard.

As shown in the upper part of FIG. 2, each frame used for single carrier transmission is formed by a frame header composed of 420, 595, or 945 symbols and by a frame body made of 3780 symbols. The frame body is constituted by system information (SI) composed of 36 symbols and by data of 3744 symbols.

Figure 3:
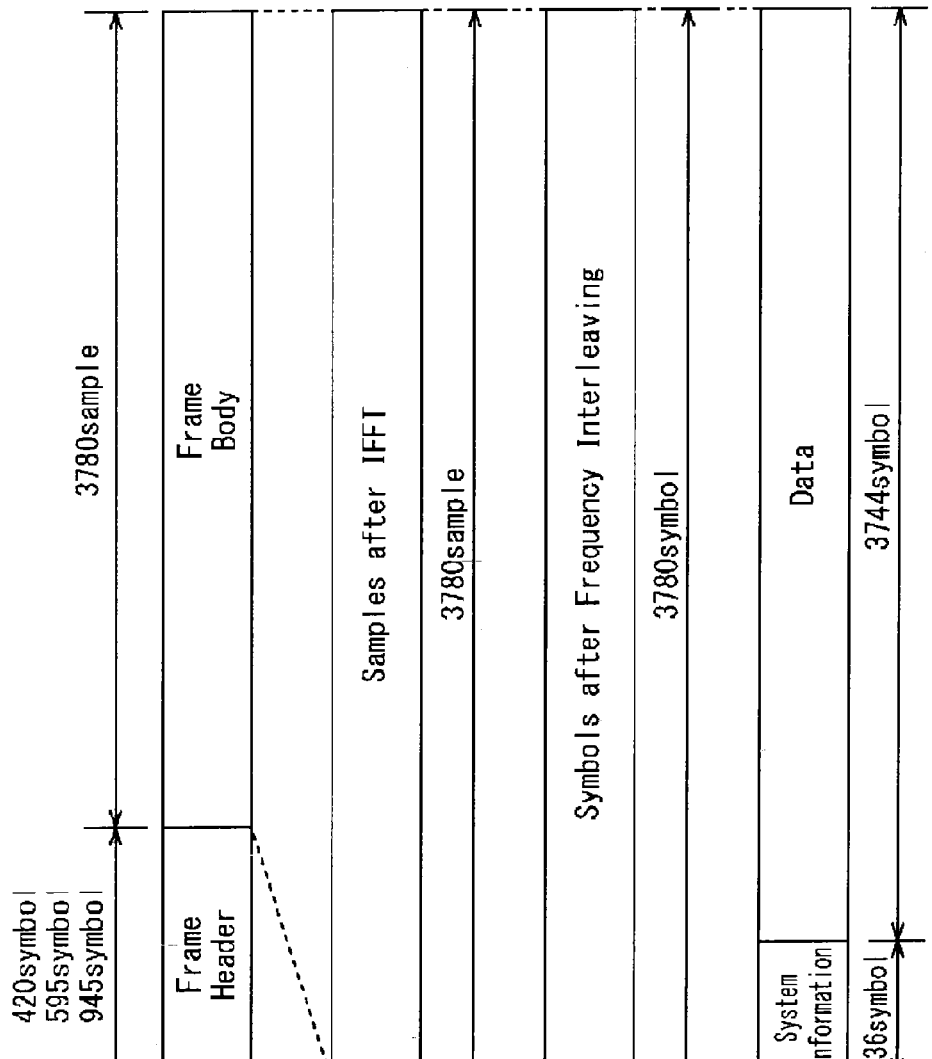
FIG. 3 is a schematic view showing the frame structure for a multi-carrier data transmission complying with the DTMB standard.

FIG. 3 is a schematic view showing the frame structure for a multi-carrier data transmission complying with the DTMB standard.

As shown in the uppermost part of FIG. 3, each frame used for multi-carrier transmission is formed by a frame header composed of 420, 595, or 945 symbols and by a frame body made of 3780 samples.

As shown in the lowermost part of FIG. 3, the frame body accommodates 3780 samples made up of 36-symbol SI and 3744-symbol data that have been frequency-interleaved and subjected to an IFFT operation. In order to demodulate the transmitted data, the multi-carrier demodulation block 16 generally needs to perform an FFT operation on the 3780-sample frame body followed by a frequency deinterleave process.

Incidentally, a symbol stands for data transmitted by one carrier, and a sample denotes data obtained by performing an IFFT operation on one symbol. In the reception apparatus 1 on the receiving side, samples represent data prior to an FFT operation and symbols denote the data obtained by performing the FFT operation on the samples.

The single carrier demodulation block 15 in FIG. 1 outputs data transmitted using the frame having the structure shown in FIG. 2, and the multi-carrier demodulation block 16 in the same figure outputs data transmitted using the frame having the structure illustrated in FIG. 3.

<First Structure Example>
[Structure of the Multi-Carrier Demodulation Block]

Figure 4:
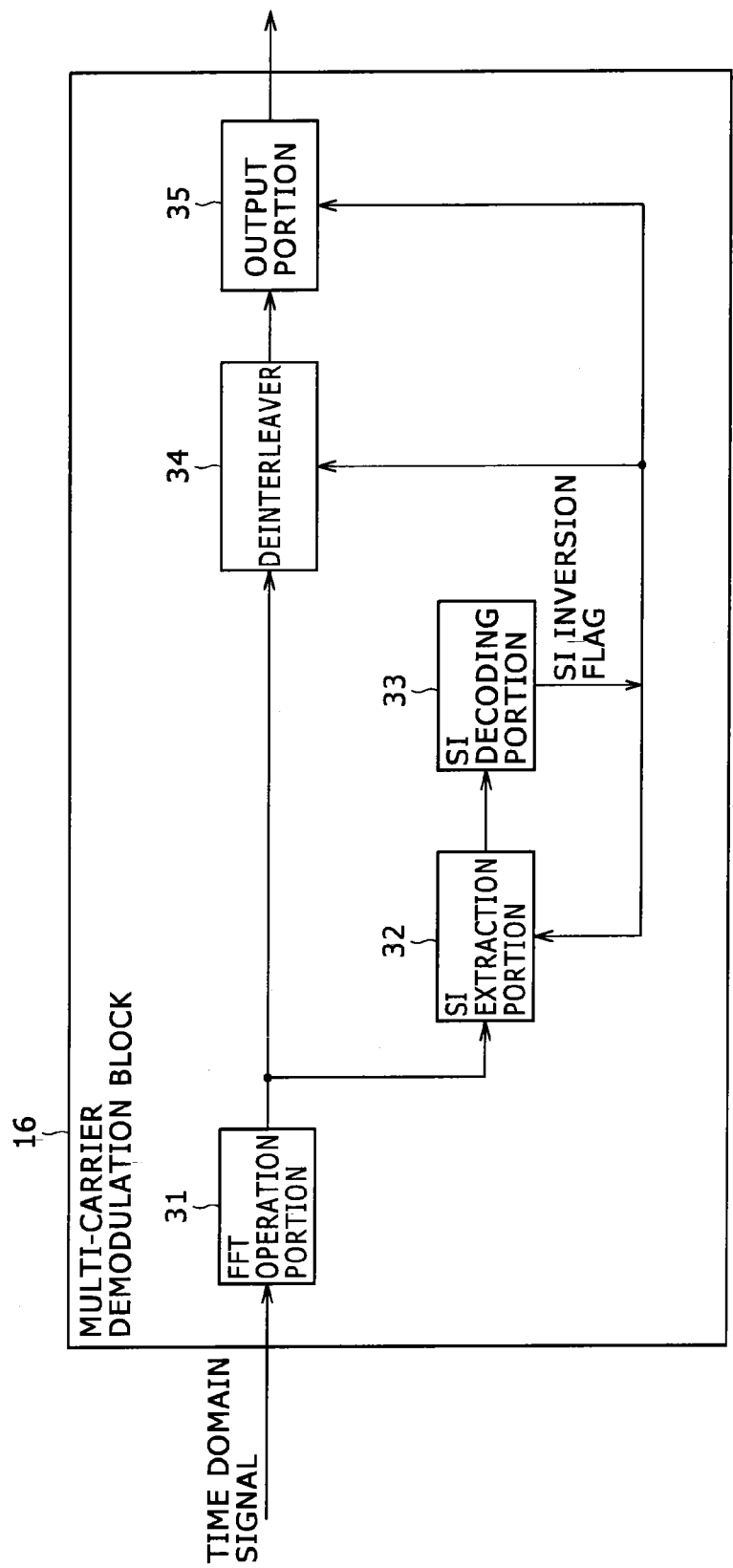
FIG. 4 is a schematic view showing a first structure example of a multi-carrier demodulation block included in FIG. 1.

FIG. 4 is a schematic view showing a first structure example of the multi-carrier demodulation block 16.

In the multi-carrier demodulation block 16 of FIG. 4, the data transmitted by the carriers considered to transport SI is extracted from the result of an FFT operation. The presence or absence of spectrum inversion is then detected based on whether SI can actually be decoded using the extracted data. SI is a known signal in the frequency domain. The DTMB standard stipulates the carriers used for transmitting SI.

The multi-carrier demodulation block 16 is made up of an FFT operation portion 31, an SI extraction portion 32, an SI decoding portion 33, a deinterleaver 34, and an output portion 35. The input to the FFT operation portion 31 is a baseband OFDM signal obtained by performing orthogonal demodulation on an IF signal using carrier signals of predetermined frequencies. The time domain signal input to the FFT operation portion 31 includes real axis components (I data) and imaginary axis components (Q data) resulting from the orthogonal demodulation.

The FFT operation portion 31 performs an FFT operation on an OFDM time domain signal that has been input. What is targeted by the FFT operation is the 3780-sample frame body of the signal explained above in reference to FIG. 3. The FFT operation portion 31 outputs, as the result of the FFT operation, the data (symbols) transmitted by 3780 carriers and obtained from the FFT operation. The signal output from the FFT operation portion 31 is a frequency domain signal stemming from the FFT operation. The frequency domain signal is input to the SI extraction portion 32 and deinterleaver 34.

Given the data fed from the FFT operation portion 31, the SI extraction portion 32 extracts that part of the data which is transmitted by predetermined carriers in accordance with an SI inversion flag supplied from the SI decoding portion 33. The SI extraction portion 32 outputs the extracted data to the SI decoding portion 33.

The SI inversion flag represents the presence or absence of spectrum inversion. An SI inversion flag set to "1" indicates the presence of spectrum inversion, and an SI inversion flag set to "0" denotes the absence of spectrum inversion. The data to be extracted is switched depending on whether the SI inversion flag is "1" or "0."

Figure 5:
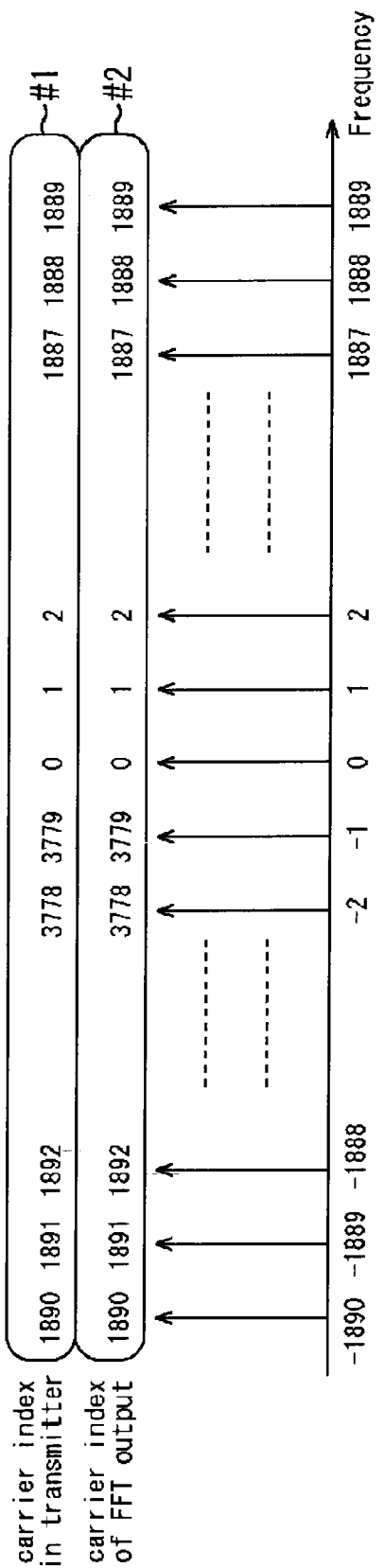
FIG. 5 is a schematic view showing the output of an FFT operation portion in effect when spectrum inversion is absent.

FIG. 5 is a schematic view showing the output of the FFT operation portion 31 in effect when spectrum inversion is absent.

The horizontal axis of FIG. 5 represents frequencies. Upward-pointing arrows arrayed on the horizontal axis denote carriers. With the center frequency positioned at 0, 3780 carriers are arrayed at intervals of a predetermined frequency. A carrier index is assigned to each of the carriers.

The carrier index 0 is assigned to the carrier positioned at frequency 0. In the direction of increasing frequencies in reference to the carrier having the carrier index 0, the carriers having the carrier indexes 1 through 1889 are positioned at frequencies 1 through 1889 respectively. In the direction of decreasing frequencies in reference to the carrier with the carrier index 0, the carriers having the carrier indexes 3779 through 1890 are positioned at frequencies −1 through −1890 respectively.

If spectrum inversion is absent in the output of the FFT operation portion 31, the carrier indexes of the carriers on the transmitting side match those of the carriers having undergone the FFT operation on the receiving side, as can be seen when the carrier indexes of the carriers are compared with the matching frequencies. In FIG. 5, the numbers enclosed by solid line #1 represent the carrier indexes of the carriers on the transmitting side, and the numbers enclosed by solid line #2 denote the carrier indexes resulting from the FFT operation on the receiving side.

The DTMB standard stipulates that SI be transmitted using a total of 36 carriers constituted by 17 carriers positioned in the direction of increasing frequencies and by 18 carriers positioned in the direction of decreasing frequencies in reference to the carrier positioned at frequency 0. Where spectrum inversion is absent, the transmitting side transmits SI using the carriers having the carrier indexes 0 through 17 and 3762 through 3779. It follows that, of the outputs of the FFT operation portion 31, the receiving side can decode SI using the data transmitted by the carriers having the same carrier indexes, i.e., carriers having the carrier indexes 0 through 17 and 3762 through 3779.

Figure 6:
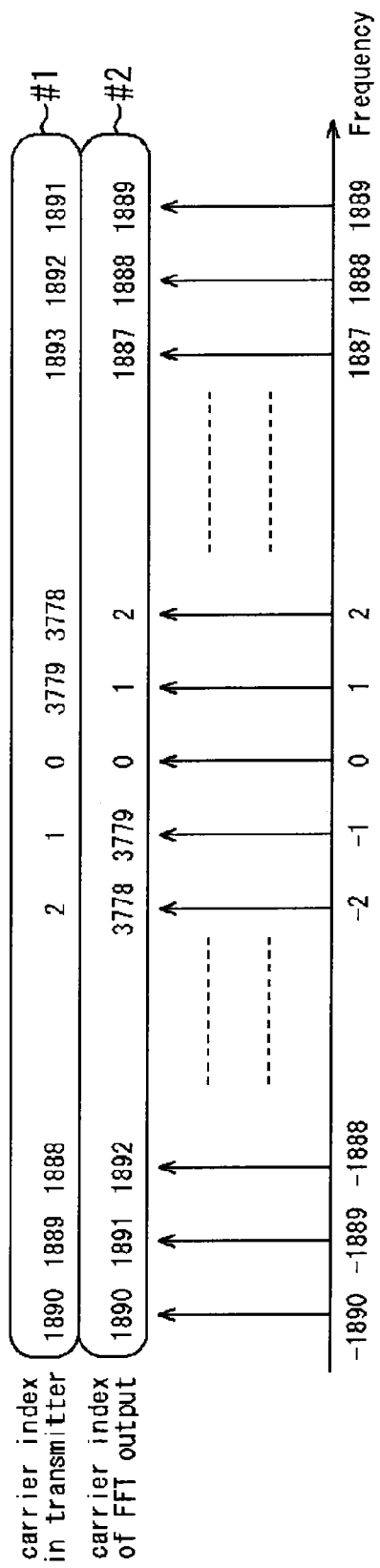
FIG. 6 is a schematic view showing the output of the FFT operation portion in effect when spectrum inversion is present.

FIG. 6 is a schematic view showing the output of the FFT operation portion 31 in effect when spectrum inversion is present.

If spectrum inversion is present in the output of the FFT operation portion 31, solely the carrier index 0 or 1890 on the transmitting side matches its counterpart on the receiving side following the FFT operation, as shown in FIG. 6. The other carrier indexes on the transmitting side do not match those on the receiving side following the FFT operation. Between the carrier indexes on the transmitting side on the one hand and those on the receiving side subsequent to the FFT operation on the other hand, the following relationship holds:

3780−(carrier index of the FFT output on the receiving side)=(carrier index on the transmitting side)

Spectrum inversion shown in FIG. 6, with carrier index misalignments observed on the transmitting side, may occur due to the settings on the transmitting side.

Where spectrum inversion is present, the transmitting side also transmits SI using a total of 36 carriers constituted by 17 carriers positioned in the direction of increasing frequencies and by 18 carriers positioned in the direction of decreasing frequencies in reference to the carrier positioned at frequency 0. The reception apparatus 1 can decode SI using that part of the data output from the FFT operation portion 31 which has been transmitted by the carriers having the carrier indexes 0 through 18 and 3763 through 3779 on the receiving side.

If the SI inversion flag has the value "0" (i.e., where spectrum inversion is absent), the SI extraction portion 32 in FIG. 4 extracts the data transmitted by the carriers having the carrier indexes 0 through 17 and 3762 through 3779. If the SI inversion flag has the value "1" (where spectrum inversion is present), the SI extraction portion 32 extracts the data transmitted by the carriers having the carrier indexes 0 through 18 and 3763 through 3779. The data extracted by the SI extraction portion 32 is supplied to the SI decoding portion 33.

The SI decoding portion 33 decodes SI by rearranging the data fed from the SI extraction portion 32 into the order stipulated by the DTMB standard. The DTMB standard stipulates the carriers in the order of which the data transmitted by the 36 carriers is rearranged for decoding SI.

If SI can be decoded, that means the current value of the SI inversion flag is correct. When SI is decoded, the SI decoding portion 33 finalizes the value of the SI inversion flag and outputs the finalized SI inversion flag. If SI may not be decoded, that means the current value of the SI inversion flag is not correct. When SI is not decoded, the SI decoding portion 33 sets the SI inversion flag to "1" if its current value is "0" or to "0" if its current value is "1," and outputs the changed SI inversion flag. The SI inversion flag output from the SI decoding portion 33 is sent to the SI extraction portion 32, deinterleaver 34, and output portion 35.

If the SI inversion flag fed from the SI decoding portion 33 has the value "0," the deinterleaver 34 references the unchanged carrier indexes of the data and frequency-deinterleaves the input data in the reverse order of interleaving stipulated by the DTMB standard. Frequency deinterleave under the DTMB standard involves rearranging the data of the carriers input from the FFT operation portion 31 into the reverse order of that in which the data was interleaved.

If the SI inversion flag fed from the SI decoding portion 33 has the value "1," the deinterleaver 34 reads the carrier indexes of the input data differently. In reference to the differently read carrier indexes, the deinterleaver 34 performs a frequency deinterleave operation by rearranging the data of the carriers input from the FFT operation portion 31 into the reverse order of that in which the data was interleaved.

When reading the carrier indexes differently, the deinterleaver 34 handles the data having the carrier index 0 as the data with its carrier index unchanged (i.e., carrier index 0). With regard to the data having the other carrier indexes, each carrier index is read anew as 3780 minus the carrier index of the data in question. The data of interest is then handled using its differently read carrier index.

The deinterleaver 34 outputs the data obtained through the frequency deinterleave operation to the output portion 35.

If the SI inversion flag fed from the SI decoding portion 33 has the value "0," the output portion 35 outputs unchanged the data coming from the deinterleaver 34. If the SI inversion flag has the value "1," the output portion 35 outputs I and Q data switched in their positions, the data being supplied from the deinterleaver 34.

As explained above, the multi-carrier demodulation block 16 extracts data from the data obtained through the FFT operation in accordance with the settings of the SI inversion flag. The multi-carrier demodulation block 16 then detects the presence or absence of spectrum inversion based on whether SI can be decoded using the extracted data. That is, the SI decoding portion 33 functions as a detection section that decodes SI using the data transmitted by the carriers used for transporting SI. The detection section detects the presence or absence of spectrum inversion based on whether SI can be decoded.

Upon detecting the presence of spectrum inversion, the multi-carrier demodulation block 16 reads the carrier indexes differently and performs a frequency deinterleave operation. Spectrum inversion is corrected by outputting I and Q data switched in their positions. The deinterleaver 34 and output portion 35 function as a correction section that corrects spectrum inversion when its presence is detected.

[Operation of the Multi-Carrier Demodulation Block]

Figure 7:
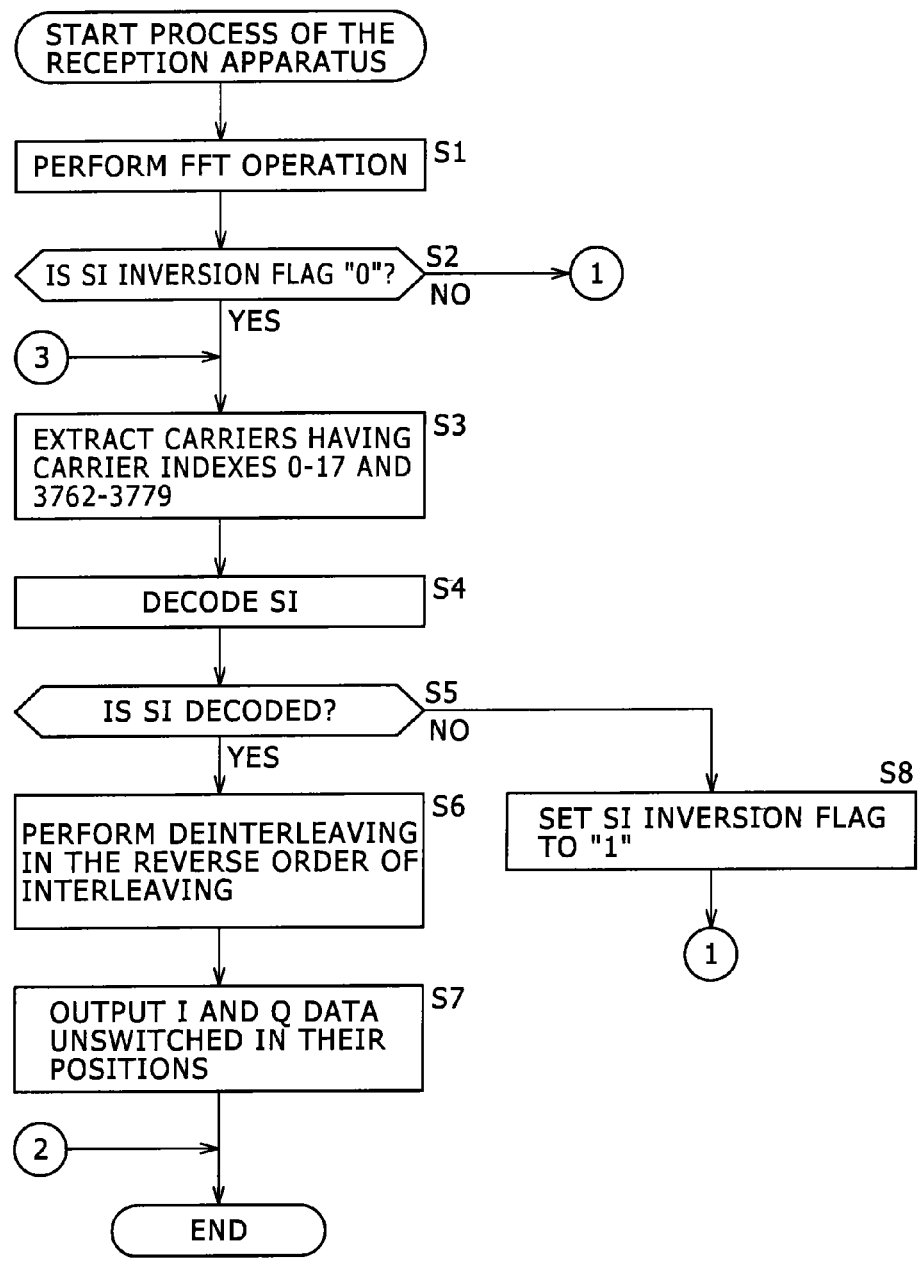
FIG. 7 is a flowchart explanatory of a typical process performed by the multi-carrier demodulation block of FIG. 4.
Figure 8:
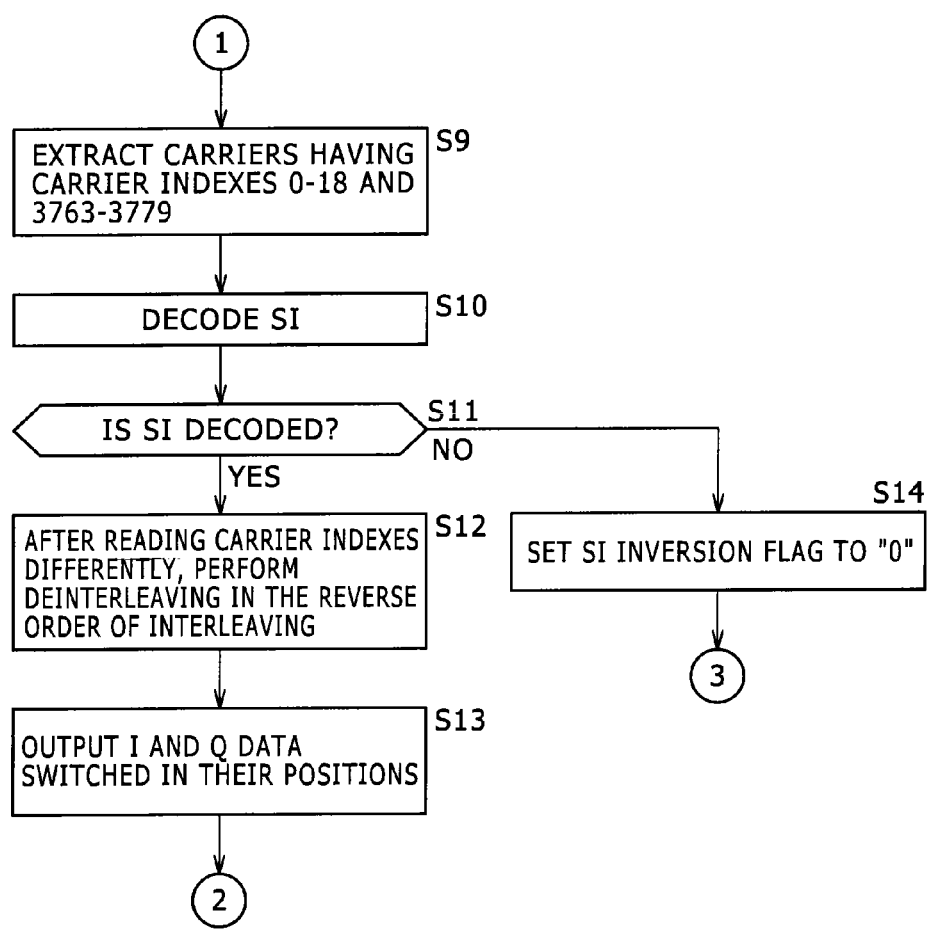
FIG. 8 is a flowchart continued from the flowchart of FIG. 7.

Explained below in reference to the flowcharts of FIGS. 7 and 8 is a typical process carried out by the multi-carrier demodulation block 16 of FIG. 4. The process in FIGS. 7 and 8 may be started when an instruction to start data reception is given, for example. Given the instruction to start receiving data, the SI decoding portion 33 outputs the SI inversion flag being set to either "0" or "1."

In step S1, the FFT operation portion 31 performs an FFT operation on the 3780-sample frame body of the signal.

In step S2, the SI extraction portion 32 determines whether the SI inversion flag fed from the SI decoding portion 33 has the value "0."

If it is determined in step S2 that the SI inversion flag has the value "0," step S3 is reached. In step S3, given the output of the FFT operation portion 31, the SI extraction portion 32 outputs the data transmitted by the carriers having the carrier indexes 0 through 17 and 3762 through 3779.

In step S4, the SI decoding portion 33 decodes SI by rearranging the data extracted by the SI extraction portion 32 into the order stipulated by the DTMB standard.

In step S5, the SI decoding portion 33 determines whether SI can be decoded. If it is determined that SI can be decoded, then the SI decoding portion 33 finalizes the value "0" of the SI inversion flag. If SI can be decoded using the data transmitted by the carriers having the carrier indexes 0 through 17 and 3762 through 3779, i.e., carriers used for transporting SI on the assumption that spectrum inversion is absent, then the SI decoding portion 33 detects the absence of spectrum inversion.

After the value "0" of the SI inversion flag is finalized, step S6 is reached. In step S6, the deinterleaver 34 references the unchanged carrier indexes and frequency-deinterleaves the data of each input carrier in the reverse order of that which is stipulated by the DTMB standard for interleaving.

In step S7, the output portion 35 outputs unchanged the data supplied from the deinterleaver 34 and brings the process to an end.

If it is determined in step S5 that SI may not be decoded, step S8 is reached. In step S8, the SI decoding portion 33 sets the SL inversion flag to "1."

If the value of the SI inversion flag is changed in step S8 or if it is determined in step S2 that the value of the SI inversion flag is not "0" but "1," then step S9 is reached. In step S9, given the output of the FFT operation portion 31, the SI extraction portion 32 extracts the data transmitted by the carriers having the carrier indexes 0 through 18 and 3763 through 3779.

In step S10, the SI decoding portion 33 decodes SI by rearranging the data extracted by the SI extraction portion 32 into the order stipulated by the DTMB standard.

In step S11, the SI decoding portion 33 determines whether SI can be decoded. If it is determined that SI can be decoded, then the SI decoding portion 33 finalizes the value "1" of the SI inversion flag. If SI can be decoded using the data transmitted by the carriers having the carrier indexes 0 through 18 and 3763 through 3779, i.e., carriers used for transporting SI on the assumption that spectrum inversion is present, then the SI decoding portion 33 detects the presence of spectrum inversion.

After the value "1" of the SI inversion flag is finalized, step S12 is reached. In step S12, the deinterleaver 34 reads the carrier indexes of the input data differently as explained above and performs a frequency deinterleave operation in reference to the differently read carrier indexes.

In step S13, given the frequency-deinterleaved data from the deinterleaver 34, the output portion 35 outputs I and Q data switched in their positions and brings the process to an end.

If it is determined in step S11 that SI may not be decoded, step S14 is reached. In step S14, the SI decoding portion 33 sets the value of the SI inversion flag to "0." With the value of the SI inversion flag thus changed to "0," step S3 is reached again and the subsequent steps are repeated.

In the manner described above, data can be demodulated correctly even if spectrum inversion is present in a multi-carrier data transmission.

Second Embodiment

[Structure of the Multi-Carrier Demodulation Block]

Figure 9:
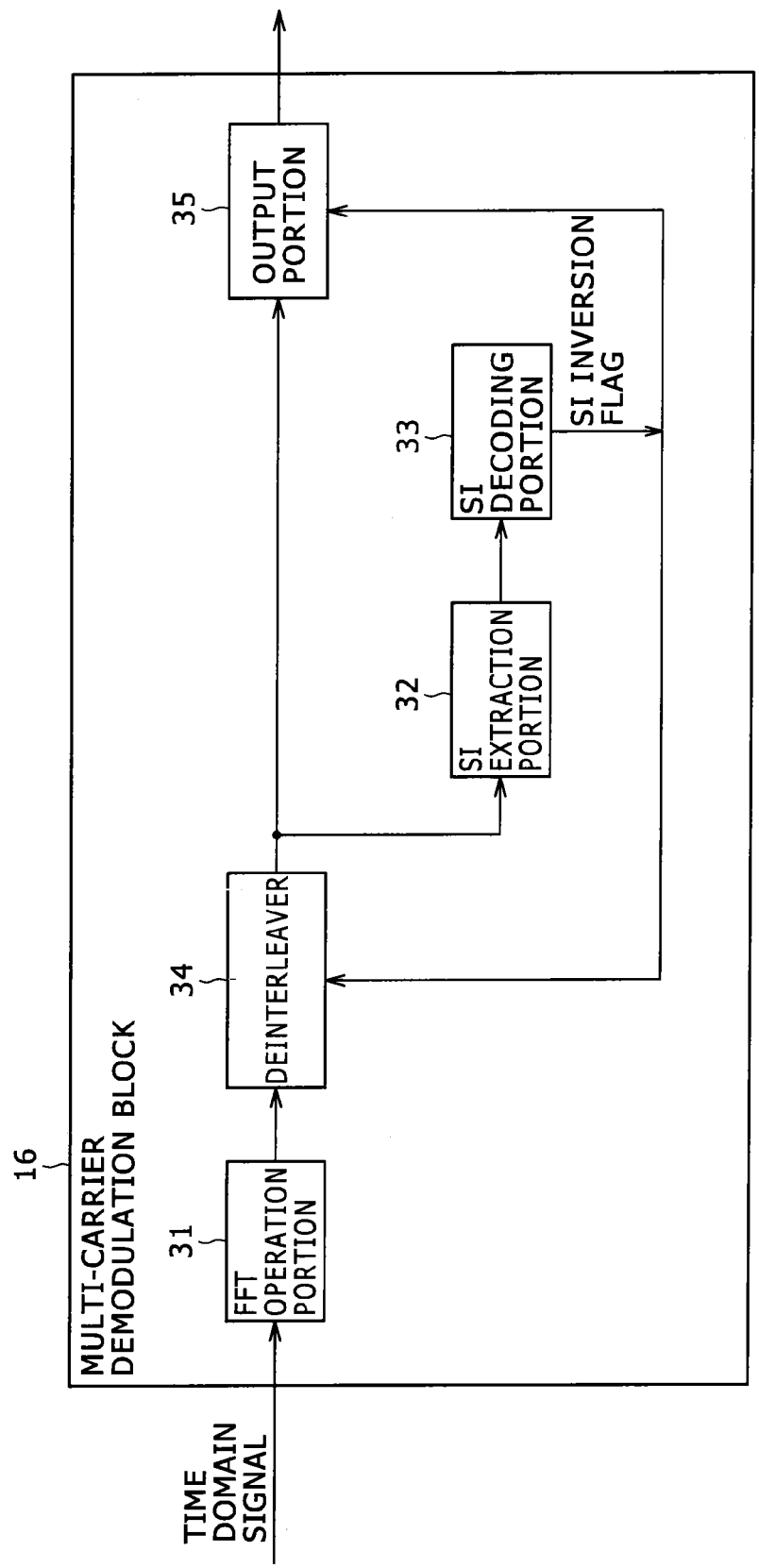
FIG. 9 is a schematic view showing a second structure example of the multi-carrier demodulation block included in FIG. 1.

FIG. 9 is a schematic view showing a second structure example of the multi-carrier demodulation block 16.

With regard to the structure in FIG. 4, it was shown that the source from which to extract the data for determining whether SI can be decoded is the result of the FFT operation. On the other hand, the multi-carrier demodulation block 16 shown in FIG. 9 determines whether SI can be decoded based on the data extracted from the result of a frequency deinterleave operation. That is, the multi-carrier demodulation block 16 of FIG. 9 decodes SI after carrying out the frequency deinterleave operation. With the frequency deinterleave operation performed beforehand, it is possible to adjust data rate accordingly.

The multi-carrier demodulation block 16 of FIG. 9 is also made up of the FFT operation portion 31, SI extraction portion 32, SI decoding portion 33, deinterleaver 34, and output portion 35. The explanations of these components may be omitted hereunder where redundant.

Given an input OFDM time domain signal, the FFT operation portion 31 performs an FFT operation on the 3780-sample frame body of the sample. The FFT operation portion 31 outputs a frequency domain signal resulting from the FFT operation to the deinterleaver 34.

If the SI inversion flag fed from the SI decoding portion 33 has the value "0," the deinterleaver 34 references the unchanged carrier indexes and frequency-deinterleaves the data of each input carrier in the reverse order of that which is stipulated by the DTMB standard for interleaving.

If the SI inversion flag fed from the SI decoding portion 33 has the value "1," the deinterleaver 34 reads each carrier index of the input data as 3780 minus the corresponding carrier index of the input data. In reference to the differently read carrier indexes, the deinterleaver 34 performs a frequency deinterleave operation by rearranging the data input from the FFT operation portion 31 into the reverse order of that in which the data was interleaved.

The deinterleaver 34 outputs the data obtained by the frequency deinterleave operation to the SI extraction portion 32 and output portion 35.

Given the data fed from the deinterleaver 34, the SI extraction portion 32 extracts the data transmitted by the carriers having the carrier indexes 0 through 35, and outputs the extracted data to the SI decoding portion 33. Where the data having undergone the frequency deinterleave operation is concerned, the carriers having the carrier indexes 0 through 35 are considered to be the carriers transporting SI regardless of the presence or absence of spectrum inversion under the DTMB standard.

The SI decoding portion 33 decodes SI using the data supplied from the SI extraction portion 32. If SI can be decoded, that means the current value of the SI inversion flag is correct. When SI can be decoded, the SI decoding portion 33 finalizes the current SI inversion flag and outputs the finalized SI inversion flag. If SI may not be decoded, that means the current value of the SI inversion flag is not correct. When SI may not be decoded, the SI decoding portion 33 sets the SI inversion flag to "1" if its current value is "0" or to "0" if its current value is "1," and outputs the changed SI inversion flag. The SI inversion flag output from the SI decoding portion 33 is forwarded to the deinterleaver 34 and output portion 35.

If the SI inversion flag fed from the SI decoding portion 33 has the value "0," the output portion 35 outputs unchanged the data coming from the deinterleaver 34. If the SI inversion flag supplied from the SI decoding portion 33 has the value "1," the output portion 35 outputs I and Q data switched in their positions, the data being fed from the deinterleaver 34.

As explained above, the multi-carrier demodulation block 16 of FIG. 9 obtains data by performing a frequency deinterleave operation on the result of the FFT operation, extracts from the obtained data that part thereof which is transmitted by the carriers considered to transport SI, and detects the presence or absence of spectrum inversion based on whether SI can be decoded using the extracted data. The SI decoding portion 33 functions as a detection section that decodes SI using the data transmitted by the carriers used for transporting SI. The detection section detects the presence or absence of spectrum inversion based on whether SI can be decoded in that manner.

When the presence of spectrum inversion is detected, spectrum inversion is corrected by outputting I and Q data switched in their positions out of the data obtained through frequency deinterleaving. The output portion 35 functions as a correction section that corrects spectrum inversion when its presence is detected.

[Operation of the Multi-Carrier Demodulation Block]

Figure 10:
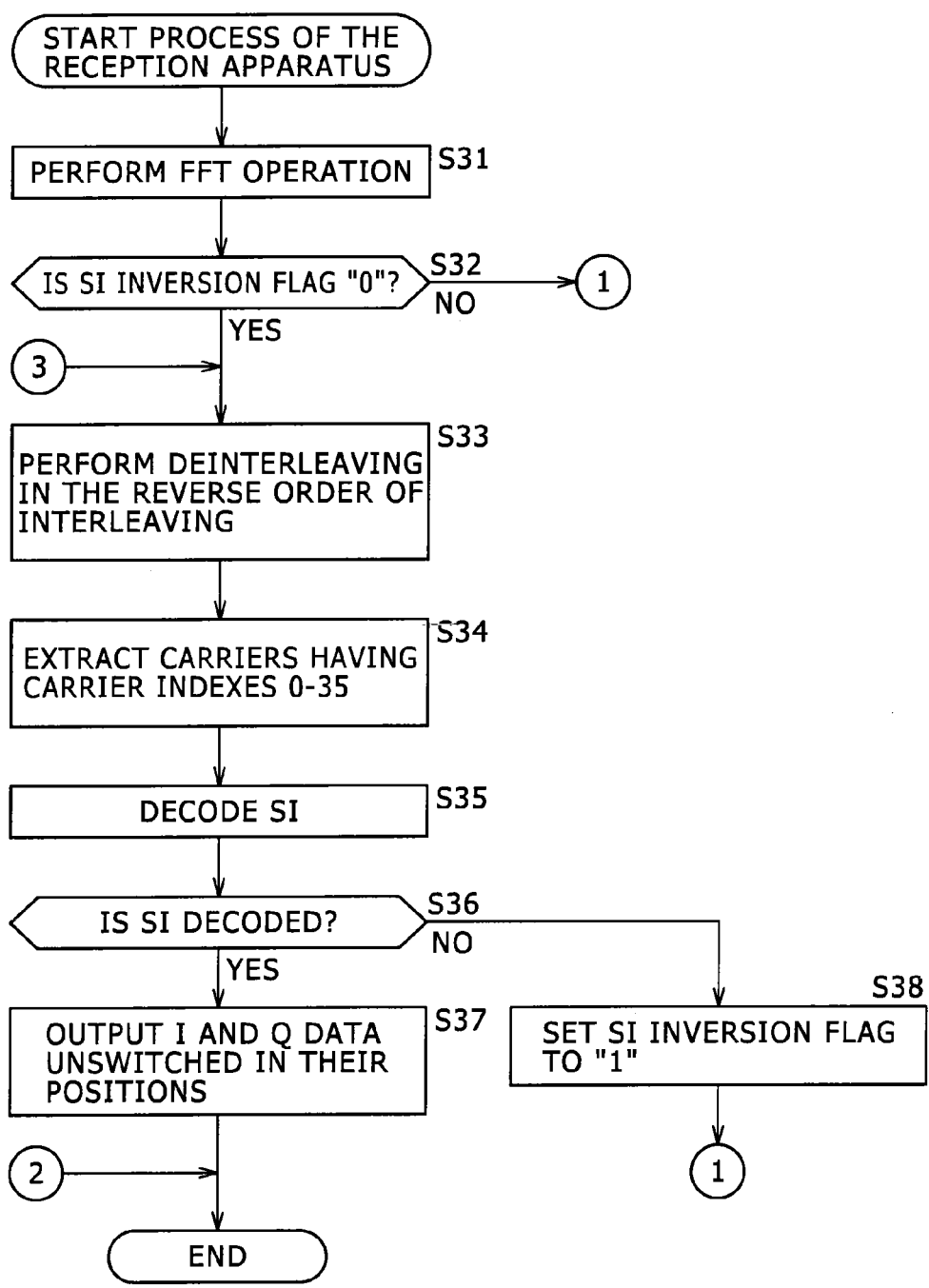
FIG. 10 is a flowchart explanatory of a typical process performed by the multi-carrier demodulation block of FIG. 9.
Figure 11:
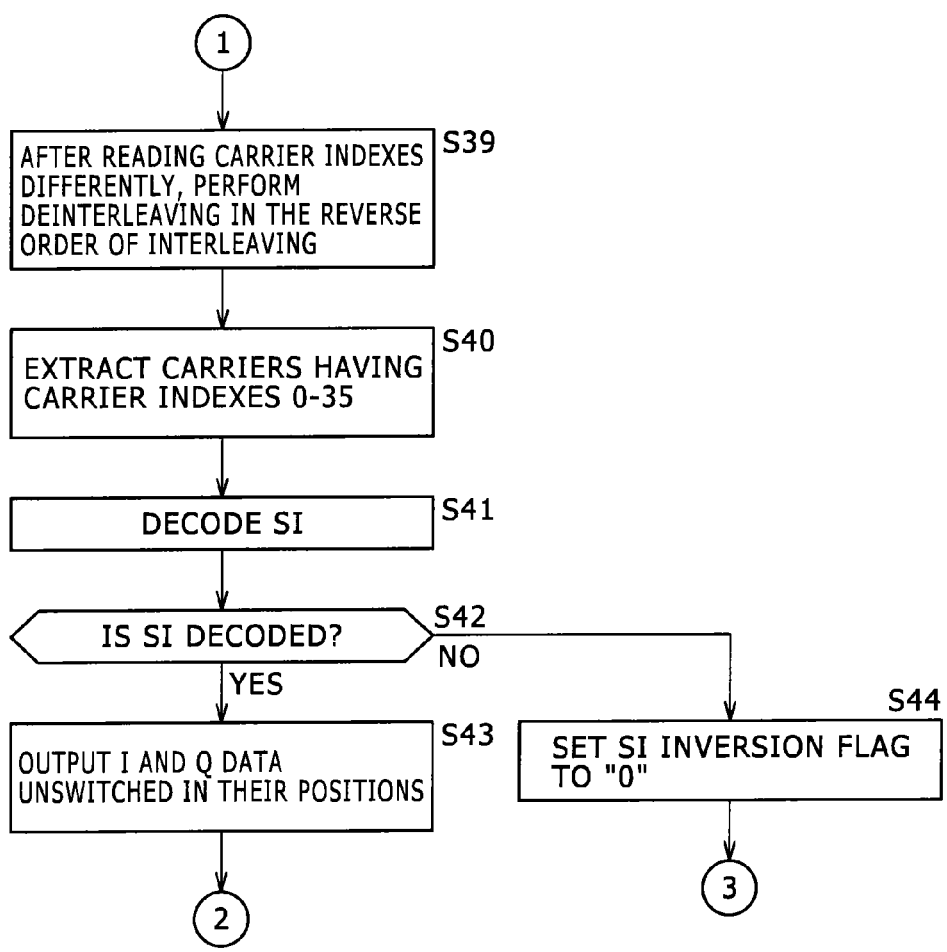
FIG. 11 is a flowchart continued from the flowchart of FIG. 10.

Explained below in reference to the flowcharts of FIGS. 10 and 11 is a typical process carried out by the multi-carrier demodulation block 16 of FIG. 9. The process in FIGS. 10 and 11 may also be started when an instruction to start data reception is given, for example. Given the instruction to start receiving data, the SI decoding portion 33 outputs the SI inversion flag being set to either "0" or "1."

In step S31, the FFT operation portion 31 performs an FFT operation on the 3780-sample frame body of the signal.

In step S32, the deinterleaver 34 determines whether the SI inversion flag fed from the SI decoding portion 33 has the value "0."

If it is determined in step S32 that the SI inversion flag has the value "0," step S33 is reached. In step S33, the deinterleaver 34 references the unchanged carrier indexes and performs a frequency deinterleave operation on the input data in the reverse order of that which is stipulated by the DTMB standard for interleaving.

In step S34, given the output of the deinterleaver 34, the SI extraction portion 32 extracts the data transmitted by the carriers having the carrier indexes 0 through 35.

In step S35, the SI decoding portion 33 decodes SI using the data extracted by the SI extraction portion 32.

In step S36, the SI decoding portion 33 determines whether SI can be decoded. If it is determined in step S36 that SI can be decoded, the SI decoding portion 33 finalizes the value "0" of the SI inversion flag.

In step S37, the output portion 35 outputs unchanged the data fed from the deinterleaver 34 and terminates the process.

If it is determined in step S36 that SI may not be decoded, step S38 is reached. In step S38, the SI decoding portion 33 sets the value of the SI inversion flag to "1."

If in step S38 the value of the SI inversion flag is changed or if in step S32 it is determined that the value of the SI inversion flag is not "0" but "1," then step S39 is reached. In step S39, the deinterleaver 34 reads the carrier indexes of the input data differently as explained above, and performs a frequency deinterleave operation in reference to the differently read carrier indexes.

In step S40, given the output of the deinterleaver 34, the SI extraction-portion 32 extracts the data transmitted by the carriers having the carrier indexes 0 through 35.

In step S41, the SI decoding portion 33 decodes SI by rearranging the data extracted by the SI extraction portion 32 into the order stipulated by the DTMB standard.

In step S42, the SI decoding portion 33 determines whether SI can be decoded. If it is determined in step S42 that SI can be decoded, the SI decoding portion 33 finalizes the value "1" of the SI inversion flag.

After the value "1" of the SI inversion flag is finalized, step S43 is reached. In step S43, the output portion 35 outputs I and Q data switched in their positions out of the frequency-deinterleaved data supplied from the deinterleaver 34, and terminates the process.

If it is determined in step S42 that SI may not be decoded, step S44 is reached. In step S44, the SI decoding portion 33 sets the value of the SI inversion flag to "0." With the value of the SI inversion flag changed to "0," step S33 is reached again and the subsequent steps are repeated.

Carrying out the steps explained in the preceding paragraphs also makes it possible to demodulate data correctly where spectrum inversion is present in a multi-carrier data transmission.

[Examples of Applying the Reception Apparatus to a Reception System]

Figure 12:
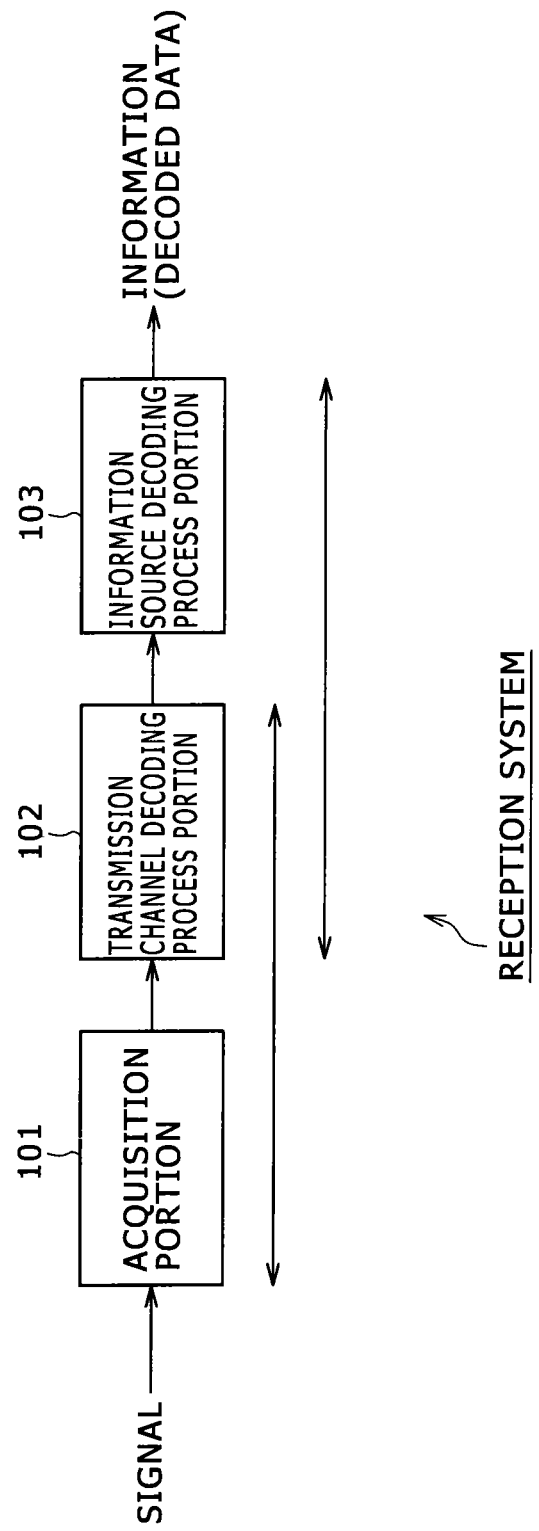
FIG. 12 is a block diagram showing a typical configuration of a first embodiment of a reception system.

FIG. 12 is a block diagram showing a typical configuration of a first embodiment of a reception system to which the multi-carrier demodulation block 16 is applied.

The reception system in FIG. 12 is made up of an acquisition portion 101, a transmission channel decoding process portion 102, and an information source decoding process portion 103.

The acquisition portion 101 acquires signals via transmission channels such as terrestrial digital broadcasts, satellite digital broadcasts, CATV networks and the Internet, not shown, and feeds the acquired signal to the transmission channel decoding process portion 102. For example, the multi-carrier demodulation block 16 shown in FIG. 4 or 9 may be included in the acquisition portion 101.

The transmission channel decoding process portion 102 performs a transmission channel decoding process including error correction on the signal acquired by the acquisition portion 101 over the transmission channels, and supplies the processed signal to the information source decoding process portion 103.

The information source decoding process portion 103 performs an information source decoding process on the signal having undergone the transmission channel decoding process, the information source decoding process including the process of expanding compressed information back to the original information so as to acquire the transmitted data.

That is, the signal acquired by the acquisition portion 101 over the transmission channels may have been subjected to a compression coding process that compresses information in order to reduce the amount of data such as images and sounds. In such a case, the information source decoding process portion 103 performs on the signal having undergone the transmission channel decoding process the information source decoding process such as the process of expanding compressed information back to the original information.

If the signal acquired by the acquisition portion 101 over the transmission channels has not been subjected to compression coding, the information source decoding process portion 103 does not perform the process of expanding compressed information back to the original information. MPEG decoding is an example of the expansion process. Also, the information source decoding process may include descrambling in addition to the expansion process.

The reception system of FIG. 12 may be applied typically to a TV tuner for receiving digital TV broadcasts. The acquisition portion 101, transmission channel decoding portion 102, and information source decoding portion 103 may each be constituted as an independent device (hardware (e.g., IC (integrated circuit)) or a software module).

Alternatively, the acquisition portion 101, transmission path decoding process portion 102, and information source decoding process portion 103 may be implemented altogether as an independent device. As another alternative, the acquisition portion 101 and transmission path decoding process portion 102 may be implemented in combination as an independent device. As a further alternative, the transmission path decoding process portion 102 and information source decoding process portion 103 may be implemented in combination as an independent device.

Figure 13:
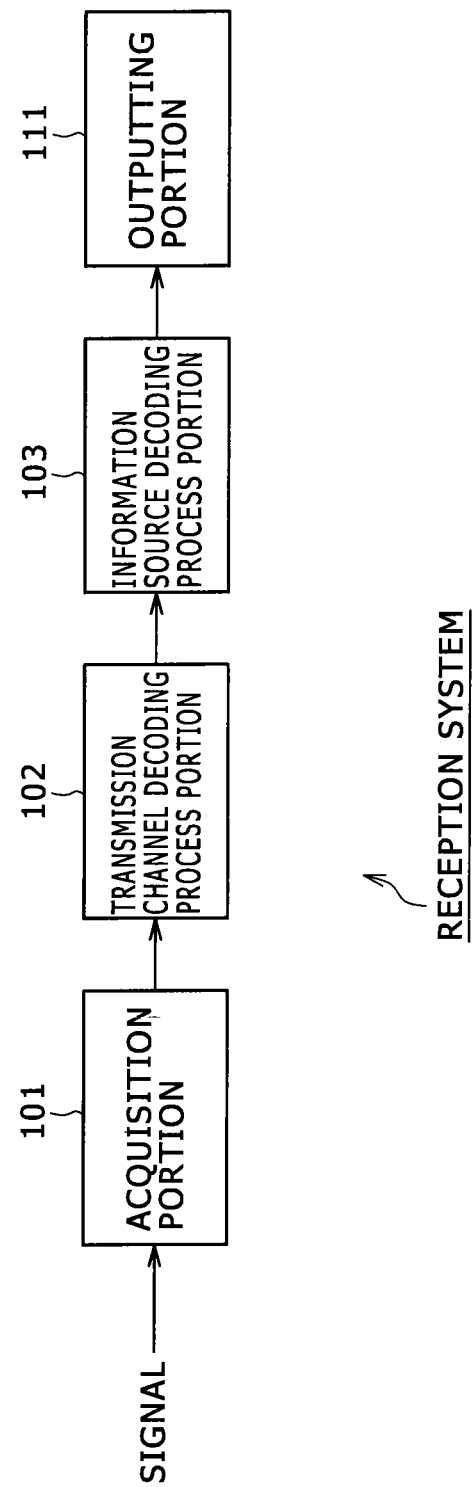
FIG. 13 is a block diagram showing a typical configuration of a second embodiment of the reception system.

FIG. 13 is a block diagram showing a typical configuration of a second embodiment of the reception system to which the multi-carrier demodulation block 16 is applied.

Of the components shown in FIG. 13, those corresponding to like components in FIG. 12 are designated by like reference characters, and their explanations may be omitted hereunder where appropriate.

The reception system of FIG. 13 is configured the same as the reception system of FIG. 12 in that the acquisition portion 101, transmission channel decoding process portion 102, and information source decoding process portion 103 are provided. On the other hand, the reception system of FIG. 13 is configured differently from the system of FIG. 12 in that an output portion 111 is provided anew.

For example, the output portion 111 may be composed of a display unit for displaying images and of speakers for outputting sounds, the output images and sounds being representative of the signal coming from the information source decoding process portion 103. Simply put, the output portion 111 outputs images and/or sounds.

The reception system of FIG. 13 may be applied to a TV set for receiving digital TV broadcasts or to a radio receiver for receiving radio broadcasts, for example.

If the signal obtained by the acquisition portion 101 has not undergone compression coding, then the signal output from the transmission channel decoding process portion 102 is sent directly to the output portion 111.

Figure 14:
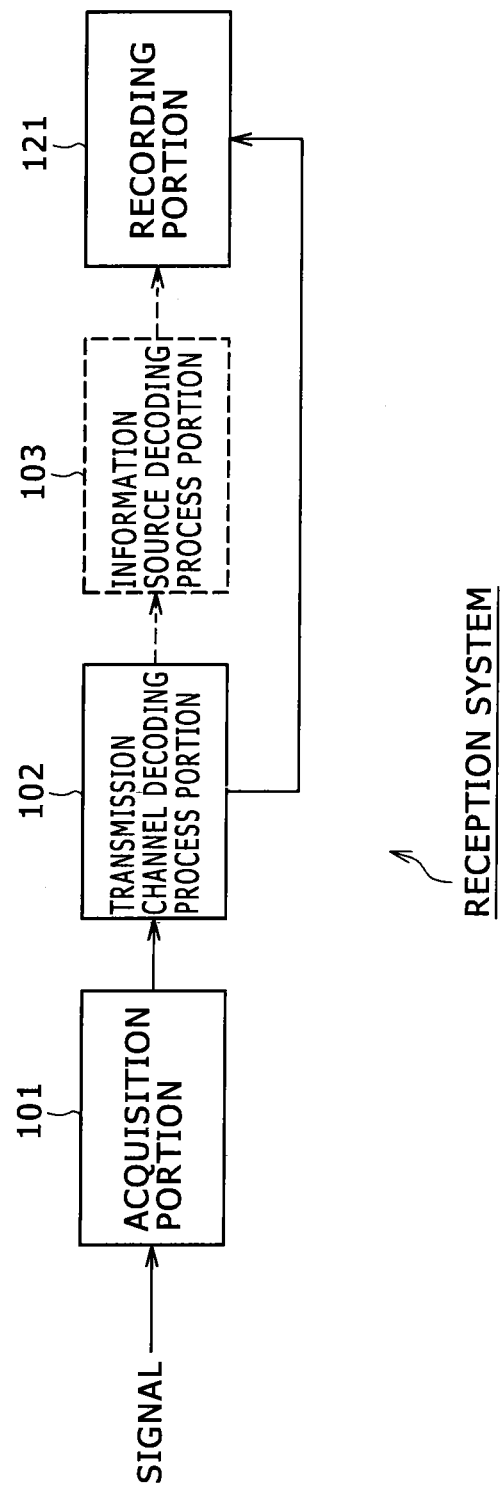
FIG. 14 is a block diagram showing a typical configuration of a third embodiment of the reception system.

FIG. 14 is a block diagram showing a typical configuration of a third embodiment of the reception system to which the multi-carrier demodulation block 16 is applied.

Of the components shown in FIG. 14, those corresponding to like components in FIG. 12 are designated by like reference characters, and their explanations may be omitted hereunder where appropriate.

The reception system of FIG. 14 is configured the same as the reception system of FIG. 12 in that the acquisition portion 101 and transmission channel decoding process portion 102 are provided. On the other hand, the reception system of FIG. 14 is configured differently from the system of FIG. 12 in that the information source decoding process portion 103 is not provided and a recording portion 121 is furnished anew.

The recording portion 121 records (i.e., stores) the signal output from the transmission channel decoding process portion 102 (e.g., TS packets in MPEG format) to recording (i.e., storage) media such as optical disks, hard disks (magnetic disks) and flash memories.

The reception system of FIG. 14 outlined above may be applied to a recorder for recording TV broadcasts, for example.

As another example, the information source decoding process portion 103 may be provided in the reception system. In this setup, the recording portion 121 may be arranged to record the signal having undergone the information source decoding process performed by the information source decoding process portion 103, the signal being representative of the images and sounds obtained through the decoding process.

[Typical Structure of the Computer]

The series of the processes described above may be executed either by hardware or by software. Where the software-based processing is to be carried out, the programs constituting the software may be either incorporated beforehand in the dedicated hardware of the computer to be used or installed upon use from a suitable program recording medium into a general-purpose personal computer or like equipment.

FIG. 15 is a block diagram showing a typical structure of a computer for executing the series of the above-described processes using suitable programs.

A CPU (central processing unit) 151, a ROM (read only memory) 152, and a RAM (random access memory) 153 are interconnected via a bus 154.

An input/output interface 155 is further connected to the bus 154. The input/output interface 155 is connected with an input device 156 typically composed of a keyboard and a mouse and with an output device 157 usually made up of a display unit and speakers. The input/output interface 155 is also connected with a storage device 158 generally constituted by a hard disk and/or a nonvolatile memory, with a communication device 159 typically formed by a network interface, and with a drive 160 for driving removable media 161.

In the computer structured as outlined above, the CPU 151 may perform the series of the above-described processes by loading relevant programs from the storage device 158 into the RAM 153 for execution by way of the input/output interface 155 and bus 154, for example.

The programs to be executed by the CPU 151 may be installed into the storage device 158 after they have been retrieved from the removable media 161 or offered through wired or wireless transmission media such as local area networks, the Internet, or digital broadcasts, for example.

Also, the programs for execution by the computer may be processed in the depicted sequence of this specification (i.e., on a time series basis), in parallel, or in otherwise appropriately timed fashion such as when they are invoked.

It should be understood by those skilled in the art that various modifications, combinations, sub-combinations and alterations may occur depending on design requirements and other factors in so far as they are within the scope of the appended claims or the equivalents thereof.

The present disclosure contains subject matter related to that disclosed in Japanese Priority Patent Application JP 2010-235149 filed in the Japan Patent Office on Oct. 20, 2010, the entire content of which is hereby incorporated by reference.

What is claimed is:

1. A reception apparatus comprising:
    circuitry configured to
        detect the presence or absence of spectrum inversion in data transmitted by a multi-carrier transmission system based on whether a known signal can be decoded from data transmitted via carriers used for transmitting said known signal, and
        correct the data transmitted by said multi-carrier transmission system when the presence of spectrum inversion is detected.

2. The reception apparatus according to claim 1, wherein the circuitry is further configured to:
    perform a Fast Fourier Transform operation on a received signal,
    read carrier indexes differently and, based on the differently read carrier indexes, to deinterleave the data obtained by the Fast Fourier Transform operation from each carrier, and
    output I and Q data switched in positions thereof after being obtained by the deinterleave operation.

3. The reception apparatus according to claim 2, wherein said circuitry decodes said known signal using the data obtained by the Fast Fourier Transform operation from each carrier but yet to be deinterleaved.

4. The reception apparatus according to claim 3, wherein said circuitry detects the absence of spectrum inversion when said known signal can be decoded using the data transmitted by the carriers used for transmitting said known signal on the assumption that spectrum inversion is absent, and detects the presence of spectrum inversion when said known signal can be decoded using the data transmitted by the carriers used for transmitting said known signal on the assumption that spectrum inversion is present.

5. The reception apparatus according to claim 2, wherein said multi-carrier transmission system complies with the Digital Terrestrial Multimedia Broadcast standard,
    said known signal is system information included in each frame, and
    said circuitry subtracts the carrier index of each carrier except 0 from 3780 so as to use the difference as the differently read carrier index thereof.

6. The reception apparatus according to claim 1, wherein the circuitry is further configured to:
    perform a Fast Fourier Transform operation on a received signal,
    deinterleave the data obtained by the Fast Fourier Transform operation from each carrier based on the carrier index thereof that is either read as is or read differently, and
    wherein said circuitry outputs I and Q data switched in positions thereof after being obtained by the deinterleave operation based on the differently read carrier indexes.

7. The reception apparatus according to claim 6, wherein said circuitry decodes said known signal using the deinterleaved data.

8. The reception apparatus according to claim 7, wherein said circuitry detects the absence of spectrum inversion if said known signal can be decoded when the deinterleave operation is performed without reading the carrier indexes differently, and detects the presence of spectrum inversion if said known signal can be decoded when the deinterleave operation is performed by reading the carrier indexes differently.

9. The reception apparatus according to claim 6, wherein said multi-carrier transmission system complies with the Digital Terrestrial Multimedia Broadcast standard;
    said known signal is system information included in each frame,
    upon reading the carrier indexes differently, said circuitry subtracts the carrier index of each carrier except 0 from 3780 so as to use the difference as the differently read carrier index thereof, and
    said circuitry decodes said system information based on the data transmitted by the carriers having carrier indexes ranging from 0 to 35.

10. A reception method comprising:
- detecting the presence or absence of spectrum inversion in data transmitted by a multi-carrier transmission system based on whether a known signal can be decoded from data transmitted via carriers used for transmitting said known signal; and
- correcting the data transmitted by said multi-carrier transmission system when the presence of spectrum inversion is detected.

11. A non-transitory computer-readable medium encoded with computer-readable instructions thereon, the computer-readable instruction when executed by a computer cause the computer to perform a method comprising:
- detecting the presence or absence of spectrum inversion in data transmitted by a multi-carrier transmission system based on whether a known signal can be decoded from data transmitted via carriers used for transmitting said known signal; and
- correcting the data transmitted by said multi-carrier transmission system when the presence of spectrum inversion is detected.

* * * * *